United States Patent [19]
King

[11] Patent Number: 5,745,741
[45] Date of Patent: Apr. 28, 1998

[54] FREQUENCY STABLE PERIODIC PULSE GENERATION APPARATUS AND METHOD

[75] Inventor: Thomas Michael King, Tempe, Ariz.

[73] Assignee: Motorola, Inc., Schaumburg, Ill.

[21] Appl. No.: 624,674

[22] Filed: Apr. 10, 1996

[51] Int. Cl.[6] ............................................. G06F 1/04
[52] U.S. Cl. ..................... 395/555; 395/558; 375/371
[58] Field of Search ........................... 395/555, 557, 395/558, 559; 375/362, 371, 375, 376

[56] References Cited

U.S. PATENT DOCUMENTS

| | | | |
|---|---|---|---|
| 4,890,305 | 12/1989 | Devries | 375/120 |
| 5,059,979 | 10/1991 | Micic et al. | 341/152 |
| 5,365,182 | 11/1994 | King | 327/115 |
| 5,398,263 | 3/1995 | Vanderspool, II et al. | 375/376 |
| 5,440,313 | 8/1995 | Osterdock et al. | 342/352 |

*Primary Examiner*—Dennis M. Butler
*Attorney, Agent, or Firm*—Frank J. Bogacz

[57] ABSTRACT

A periodic pulse generator has a programmable counter (15) and processor (10) coupled to a GPS receiver for generating a periodic clock signal. The processor (10) transmits a control word to a digital to analog converter (20) which steers a voltage controlled crystal oscillator (25), processor 10 also controls the programmable counter (15) to produce a stable output pulse, if the voltage controlled crystal osciallator (25) output is an integer frequency.

14 Claims, 1 Drawing Sheet

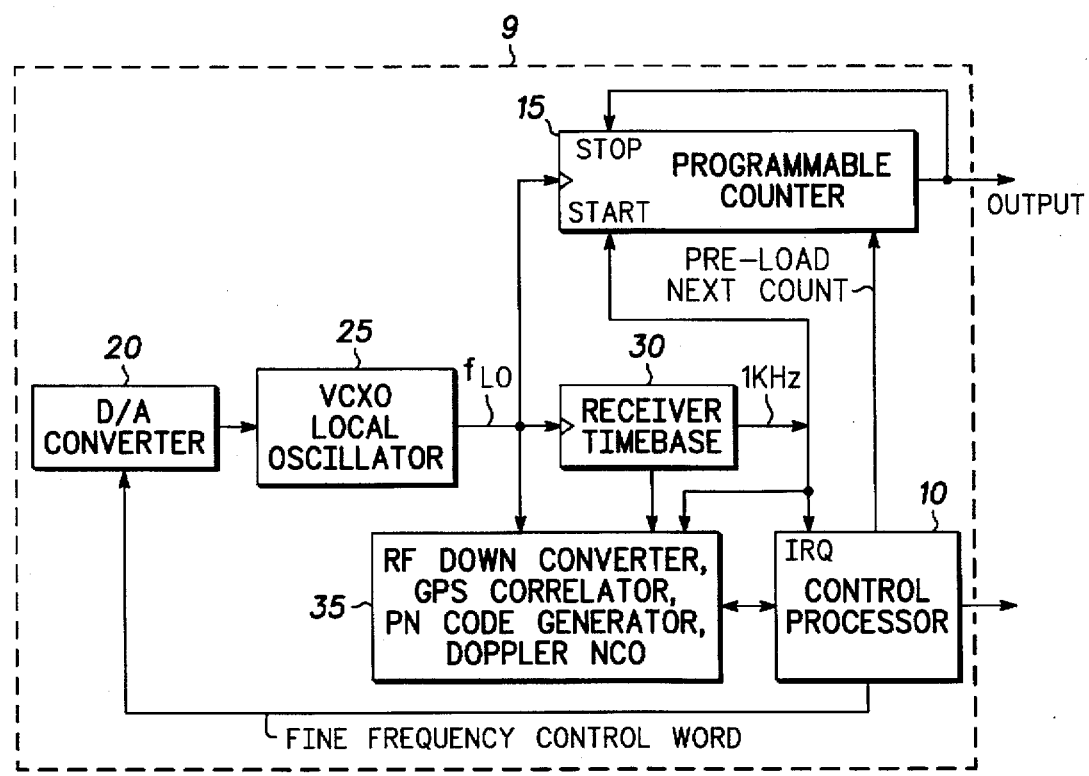

FREQUENCY STABLE PERIODIC PULSE GENERATION APPARATUS AND METHOD

BACKGROUND OF THE INVENTION

The present invention pertains to periodic pulse generation and more particularly to the generation of frequency stable, low noise periodic pulse generation.

Deriving very accurate timing signals (clock signals) is important to many electronic systems. It is becoming common to utilize the highly accurate timing data from Global Positioning System Satellites as a source of accurate time and frequency. Other highly accurate clocks have been designed using Rubidium or Cesium clocks as the reference clock. Such designs are highly accurate, but are also very expensive and have complex designs.

Typical pulse generation apparatus provide a local oscillator and count-down circuit. The accuracy of such generation apparatus is generally a function of the stability of the reference clock frequency. This means that the timing output pulse of such systems displays jitter due to the inability of the count-down circuit to resolve the output frequency to less than one integer clock cycle.

Accordingly, it would be desirable to have a periodic pulse generation apparatus for providing a low-cost, highly accurate clock output signal which is frequency stable and has little jitter or no added noise due to the implementation.

BRIEF DESCRIPTION OF THE DRAWINGS

The single sheet of drawings presented herewith dipicts a pulse generation apparatus in accordance with the present invention.

DESCRIPTION OF THE PREFERRED EMBODIMENT

The single sheet of drawings depicts an accurate pulse producing circuit, which is based on controlling the local oscillator frequency of a Global Positioning System (GPS) receiver as a fine adjustment control, and steering of a pulse to the resolution of the main system clock as a coarse pulse control. Control processor 10 is coupled to programmable counter 15. Programmable counter 15 produces the desired one pulse per second output. A one kilohertz signal derived by integer division of the local oscillator 25 is transmitted from receiver time base 30 to programmable counter 15 and to control processor 10. Control processor 10 is also coupled to RF down converter and digital GPS correlator 35. Control processor 10 is coupled to digital-to-analog converter 20. Control processor 10 provides a Local Oscillator (LO) fine frequency control word to digital-to-analog converter 20. Digital-to-analog converter 20 is coupled to voltage controlled crystal oscillator 25. Voltage controlled crystal oscillator 25 provides the function of a local oscillator, required for any receiver. The output of voltage controlled crystal oscillator 25 is the "flo" lead which couples programmable counter 15, receiver time base 30 and RF down converter 35 to the voltage controlled crystal oscillator 25.

It is desired that an accurate signal on the one pulse per second lead be provided which is a useful output of a low cost global positioning system receiver.

An approximate one pulse per second signal is generated by programmable counter 15 as a result of dividing the flo output of vcxo 25. The error in the one pulse per second output randomly falls in time within −1/flo and +1/flo, provided that the control processor 10 provides programmable counter 15 with the correct count each second so as to place the resulting output pulse on or near the UTC second tic. Control processor 10 measures the error and computes the count for the programmable counter 15. The control processor uses the clock bias and clock bias rate outputs of the GPS receiver navigation solution 35 to compute corrections which are input to digital-to-analog converter 20 and programmable counter 15. As a result of the continual adjusting of the D/A converter 20 and programmable counter 15 by the control processor 10, digital-to-analog converter 20 steers the output flo of vcxo 25 to an integer frequency. Programmable counter 15 then outputs a one pulse per second signal at the same time every second, which is consistent with the UTC one second tic. The programmable counter 15 acts as a course time adjustment of the output pulse and the voltage controlled oscillator & D/A converter acts as a fine adjustment on the output pulse. The coarse adjustment process allows for simplification of the D/A converter as the dynamic tuning range required is greatly reduced since the oscillator only needs to be adjusted in frequency to the next closest integer frequency. Once that is accomplished, the integer programmable counter can then subsequently divide the local oscillator frequency by an integer and place the output pulse at the same point in time each second, which results in an output pulse in which the short term frequency stability is that of the local oscillator itself with little added noise and time jitter.

Low cost GPS receivers of today generate 1 PPS pulses by integer division via a programmable counter only of the receiver local oscillator. In the Motorola Oncore case, the oscillator frequency is flo=19.096 MHz. The uncertainty of the local oscillator is about ±2PPM, thus it will vary over temperature between 19.096 MHz−38 Hz and 19.096 MHz+38 Hz. The oscillator in prior implementations is free running, thus after integer division by a programmable counter, there is a residual time error in the resulting 1 PPS output that is at most ½ of 1 clock cycle of the local oscillator frequency, that is; the time error falls between −½ flo seconds to +½ flo seconds in time and the error waveform is a function of the local oscillator frequency. In this new embodiment, the local oscillator frequency is steered to an integer frequency such that when divided by the programmable counter (which by nature is an integer process), the resulting 1 PPS output pulse falls precisely on top of the UTC second tic with no residual time error.

It is well known that in addition to position coordinates of latitude, longitude, height, every GPS receiver has the ability to compute its internal measurement epoch time (i.e., the precise time of the range measurements within the receiver), and the frequency of the internal local oscillator. The time and frequency outputs are a direct result of the navigation solution of 4 (or more) equations and 4 unknowns for each of the processes of computing position and velocity. The GPS receiver solves for these quantities as a direct result of computing the clock bias and clock bias rates from the standard GPS navigation solution.

Each second, the GPS receiver computes in processor 10 the measurement epoch time and the local oscillator frequency. Call these:

Tme_gps: The computed measurement epoch time.
Fos_gps: The computed local oscillator frequency.

After computation of these quantities, the new embodiment uses processor 10 to make appropriate control adjustments via the D/A (digital-to-analog) converter 20 so that the frequency of the local oscillator is an integer. The three step algorithm to do so is as follows:

STEP 1: LO FREQUENCY ADJUSTMENT TO INTEGER FREQUENCY a) Compute Fos_gps using the traditional GPS navigation algorithms.

b) Compute frequency error fe as follows:

$$fe = INT(Fos\_gps + 0.5) - Fos\_gps;$$

c) Filter the parameter fe via a 1st or 2nd order low pass loop filter, call this process LPF1(fe);

d) Integrate the output of the low pass filter to be used as an input to the D/A converter as follows:

$$DA\_word = DA\_word + K1 * LPF1(fe);$$

where DA_word is initially set to mid-range of the D/A converter input and K1 is the appropriate scale factor so that the resulting sum integrated into DA_word is in units of LO_Hz per fe_Hz after the D/A converter transfer function. Step 1 forms an automatic frequency control loop which drives the LO frequency to the closest integer frequency.

e) Send the current value of DA_word to the D/A converter, which will adjust the frequency of the local oscillator up or down slightly depending on the correction this second.

In a preferred embodiment, this processing may be accomplished in software via control processor 10.

STEP 2: COMPUTATION OF PROGRAMMABLE COUNTER CONTROL

Next, begins the process of computing the controls for the programmable counter 15. The steps accomplished by control processor 10 are:

a) Compute the time difference dt between the measurement epoch time and the next 1 PPS UTC second, as follows:

$$dt = INT(Tme\_gps + 1) - Tme\_gps;$$

b) Compute the number of LO clock cycles in this dt time measurement as:

$$clks = Flo\_gps * dt;$$

c) Compute the number of integer counts to be applied by the programmable integer counter so as to place the 1 PPS output pulse to within ±½ of 1 LO clock as:

$$int\_clks = INT(clks + 0.5);$$

Apply a correction to the programmable counter so that it will put out its pulse after counting "int_clks" counts of the receiver local oscillator.

STEP 3: ELLIMINATION OF RESIDUAL TIME ERROR (if any)

The last step requires the computation of the residual time error in the 1 PPS output pulse, and mild control on the local oscillator frequency in order to elliminate it. The steps required are:

a) From step 2 part b, compute the fractional part of the number of clocks that are required to place the pulse closest to the 1 second tic as follows:

$$frac\_clks = clks - int\_{count};$$

b) Low pass filter the quantity "frac_clks" with a 1st order low pass filter that has a time constant that is greater than that used in STEP 1, call this LPF2(frac_clks);

c) Add a correction term to the D/A converter that is proportional to the output of the LPF2 filter, as follows:

$$DA\_word = DA\_word + K2 * LPF2(frac\_clks);$$

d) Send the current value of DA_word to the D/A converter, which will adjust the frequency of the local oscillator up or down slightly depending on the correction this second.

Step 3 acts as a phase locked loop which automatically adjusts the LO frequency so as to elliminate any phase error in the resulting 1 PPS output signal.

Since the bandwidths of the two processes in STEP 1 and STEP 3 are different, they will work together to set the LO on an integer frequency AND elliminate any subsequent time residual in the output 1 PPS signal.

This invention produces a 1 PPS signal whose phase and frequency error performance is superior to that mechanized by other low cost GPS receivers. The combination of mild local oscillator frequency steering (to the nearest integer frequency) and appropriate control loop software to control the phase and frequency of the resulting signal provide a highly stable output signal and low cost system implementation.

This invention recognizes that by steering the local oscillator to one of many possible integer frequencies by addition of a D to A converter, changing the design of the crystal oscillator to a VCXO, and adding sufficient control software to steer the LO frequency to one of many integer frequencies, the system can be controlled so that the 1 PPS pulse does not have added sawtooth noise. It also recognizes that there are many integer LO frequencies that are appropriate and voltage steering need only be such that it be able to steer to the closest integer frequency.

It is also recognized that steerage of the LO to the closest integer frequency greatly simplifies the D/A control circuit since the dynamic range of this element need only be such that it has the ability to move the LO ±0.5 Hz maximum instead of over the entire range of unknown frequency range, say ±2 PPM or more on a typical local oscillator used in GPS receivers today.

Until now, to achieve an accurate 1 PPS pulse, a system needed to have a high clock frequency as a basis for division into fine resolution time slices. With this system, high accuracy can be achieved using a low system clock frequency, allowing for lower component and overall system cost and lower power consumption.

Although the preferred embodiment of the invention has been illustrated, and that form described in detail, it will be readily apparent to those skilled in the art that various modifications may be made therein without departing from the spirit of the invention or from the scope of the appended claims.

I claim:

1. An apparatus for providing a periodic pulse comprising:

a voltage controlled oscillator controlled by a voltage input signal and said voltage controlled oscillator producing a frequency output signal;

a programmable counter for providing a periodic pulse, said programmable counter coupled to said voltage controlled oscillator;

a processor for measuring an error in said periodic pulse and for producing a frequency control signal, said processor coupled to said programmable counter;

a digital-to-analog converter for converting said frequency control signal to said voltage input signal to produce an integer frequency output signal by said voltage controlled oscillator, said digital-to-analog converter coupled to said processor and to said voltage controlled oscillator; and said programmable counter further operating in response to said integer frequency output signal and to a pre-load count to maintain said pre-load count and said integer frequency output signal as integer multiples, said programmable counter producing said periodic pulse at a stable first frequency, said programmable counter coupled to said processor and to said voltage controlled oscillator.

2. The apparatus for providing a periodic pulse as claimed in claim 1, wherein there is further included a receiver time base for producing a fixed rate periodic pulse, said receiver time base coupled to said voltage controlled oscillator, to said programmable counter and to said processor.

3. The apparatus for providing a periodic pulse as claimed in claim 1, wherein said voltage controlled oscillator includes a voltage controlled crystal oscillator.

4. The apparatus for providing a periodic pulse as claimed in claim 1, wherein said processor is further coupled to said digital-to-analog converter by a parallel bus connection.

5. The apparatus for providing a periodic pulse as claimed in claim 1, wherein said programmable counter includes an output coupled to an input of said programmable counter in a feedback configuration.

6. In a GPS receiver, an apparatus for providing a periodic pulse comprising:

a voltage controlled oscillator controlled by a voltage input signal and said voltage controlled oscillator producing a frequency output signal;

a programmable counter for providing a periodic pulse, said programmable counter coupled to said voltage controlled oscillator;

a processor for measuring an error in said periodic pulse and for producing a frequency control signal, said processor coupled to said programmable counter;

a digital-to-analog converter for converting said frequency control signal to said voltage input signal to produce an integer frequency output signal by said voltage controlled oscillator, said digital-to-analog converter coupled to said processor and to said voltage controlled oscillator; and said programmable counter further operating in response to said integer frequency output signal and to a pre-load count to maintain said pre-load count and said integer frequency output signal as integer multiples, said programmable counter producing said periodic pulse at a stable first frequency, said programmable counter coupled to said processor and to said voltage controlled oscillator.

7. In a GPS receiver the apparatus for providing a periodic pulse as claimed in claim 6, wherein there is further included a receiver time base for producing a fixed rate periodic pulse, said receiver time base coupled to said voltage controlled oscillator, to said programmable counter and to said processor.

8. In a GPS receiver the apparatus for providing a periodic pulse as claimed in claim 6, wherein said voltage controlled oscillator includes a voltage controlled crystal oscillator.

9. In a GPS receiver the apparatus for providing a periodic pulse as claimed in claim 6, wherein said processor is further coupled to said digital-to-analog converter by a parallel bus connection.

10. In a GPS receiver the apparatus for providing a periodic pulse as claimed in claim 6, wherein said programmable counter includes an output coupled to an input of said programmable counter in a feedback configuration.

11. A method for providing a periodic pulse comprising the steps of:

adjusting an output of a local oscillator to an integer frequency;

computing by a processor a number of integer counts to place the periodic pulse within a plus or minus one-half of a clock frequency of the local oscillator:

setting a programmable counter to the number; and correcting a digital-to-analog converter with a fractional part of a number of clock pulses to place the periodic pulse within the plus or minus one-half of the clock frequency of a desired periodic pulse frequency.

12. The method for providing a periodic pulse as claimed in claim 11, wherein the step of adjusting includes the steps of:

computing by the processor a frequency error of the periodic pulse;

providing a control word by integrating an error of the periodic pulse through a low pass filter; and sending the control word to the digital-to-analog converter.

13. The method for providing a periodic pulse as claimed in claim 12, wherein the step of computing includes the steps of:

computing a number of local oscillator clock cycles in a particular time measurement; and applying the number of integer counts to the programmable counter.

14. The method for providing a periodic pulse as claimed in claim 13, wherein the step of correcting includes the steps of:

computing the fractional part of the number of clock pulses that are required to place the periodic pulse within one count of the desired periodic pulse frequency;

low pass filter the fractional part with a time constant to provide a low pass filtered output;

add the low pass filtered output to the control word; and sending the control word to the digital-to-analog converter.

* * * * *